US010569685B2

(12) United States Patent
Kakishima et al.

(10) Patent No.: US 10,569,685 B2
(45) Date of Patent: Feb. 25, 2020

(54) VEHICLE SEAT

(71) Applicant: Tachi-s Engineering USA, Inc., Farmington Hills, MI (US)

(72) Inventors: Yasuo Kakishima, Farmington Hills, MI (US); Rengith Francis Xavier, Farmington Hills, MI (US); Ravi Krishnan, Farmington Hills, MI (US); Avijit Gopalakrishnan, Farmington Hills, MI (US)

(73) Assignee: TACHI-S ENGINEERING U.S.A. INC., Farmington Hills, MI (US)

( * ) Notice: Subject to any disclaimer, the term of this patent is extended or adjusted under 35 U.S.C. 154(b) by 132 days.

(21) Appl. No.: 15/846,949

(22) Filed: Dec. 19, 2017

(65) Prior Publication Data

US 2019/0184880 A1  Jun. 20, 2019

(51) Int. Cl.
*B60N 2/80* (2018.01)
*B60N 2/879* (2018.01)
*B60N 2/812* (2018.01)
*B60N 2/897* (2018.01)
*B60N 2/809* (2018.01)

(52) U.S. Cl.
CPC ............. *B60N 2/879* (2018.02); *B60N 2/809* (2018.02); *B60N 2/812* (2018.02); *B60N 2/897* (2018.02); *B60N 2002/899* (2018.02)

(58) Field of Classification Search
CPC ........ B60N 2/879; B60N 2/809; B60N 2/812; B60N 2/897
USPC ..................................................... 297/217.3
See application file for complete search history.

(56) References Cited

U.S. PATENT DOCUMENTS

| 5,788,250 A * | 8/1998 | Masters | B60N 2/826 297/410 |
| 6,742,846 B1 * | 6/2004 | Isaacson | B60N 2/815 297/410 |
| 7,677,910 B2 * | 3/2010 | Yoshida | H01R 9/16 439/246 |

(Continued)

FOREIGN PATENT DOCUMENTS

| JP | 2002-184523 A | 6/2002 |
| JP | 2008-049820 A | 3/2008 |

(Continued)

*Primary Examiner* — Syed A Islam
(74) *Attorney, Agent, or Firm* — Fitch, Even, Tabin & Flannery, LLP

(57) ABSTRACT

A vehicle seat is equipped with a seatback having a mounting portion, a headrest having a headrest frame and an electric component, a first connector, and a second connector. The first connector has an engaging portion engaged with a hole of the headrest frame, a protrusion engaging the second connector, and a first connector terminal electrically connected to a lead wire of the electric component. The second connector has a first engaging piece engaged with a hole of the guide bracket from the outside of the guide bracket, a second engaging piece engaged with the protrusion of the first connector from the outside of the first connector, and a second connector terminal electrically connected to a lead wire wired in the seatback and the first connector terminal. The engagement between the hole of the mounting portion and the first engaging piece of the second connector can be released irreversibly.

7 Claims, 17 Drawing Sheets

(56) References Cited

U.S. PATENT DOCUMENTS

| | | | | |
|---|---|---|---|---|
| 7,753,708 B2* | 7/2010 | Yoshida | ............ | H01R 13/6271 |
| | | | | 439/345 |
| 8,109,570 B2* | 2/2012 | Nishiura | ................ | B60N 2/879 |
| | | | | 297/217.3 |
| 8,113,577 B2* | 2/2012 | Nishiura | ................ | F16C 1/101 |
| | | | | 297/216.12 |
| 8,123,292 B2* | 2/2012 | Nishiura | ................ | B60N 2/888 |
| | | | | 297/216.12 |
| 8,167,376 B2* | 5/2012 | Song | .................... | B60N 2/818 |
| | | | | 297/410 |
| 8,348,338 B2* | 1/2013 | Galecka | ................ | B60N 2/809 |
| | | | | 297/216.12 |
| 8,746,801 B2* | 6/2014 | Nakata | .................. | B60N 2/809 |
| | | | | 297/410 |
| 10,035,443 B1* | 7/2018 | Sayed | .................... | B60N 2/809 |
| 10,286,823 B2* | 5/2019 | Muller | .................. | B60N 2/815 |

FOREIGN PATENT DOCUMENTS

| | | |
|---|---|---|
| JP | 2008-149987 A | 7/2008 |
| JP | 2008-239075 A | 10/2008 |

* cited by examiner

FIG.13A
FIG.13B
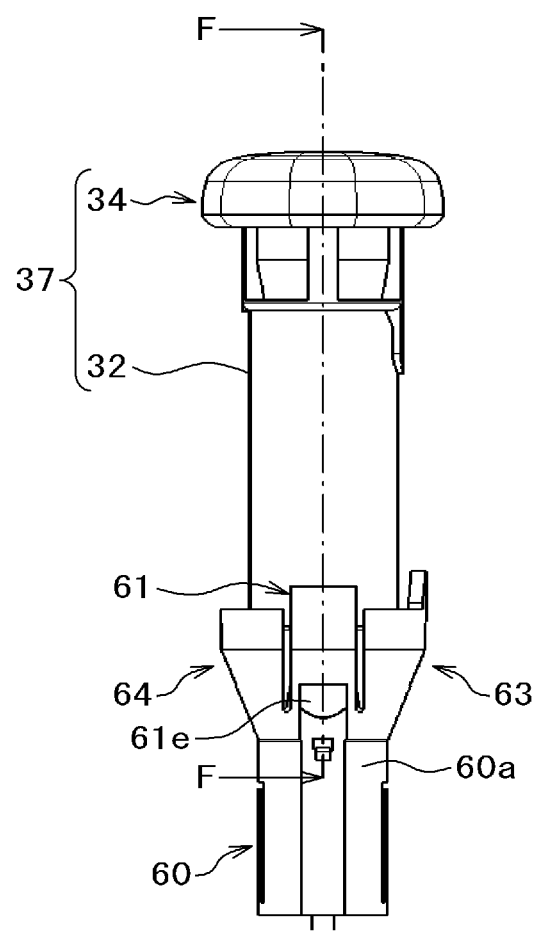
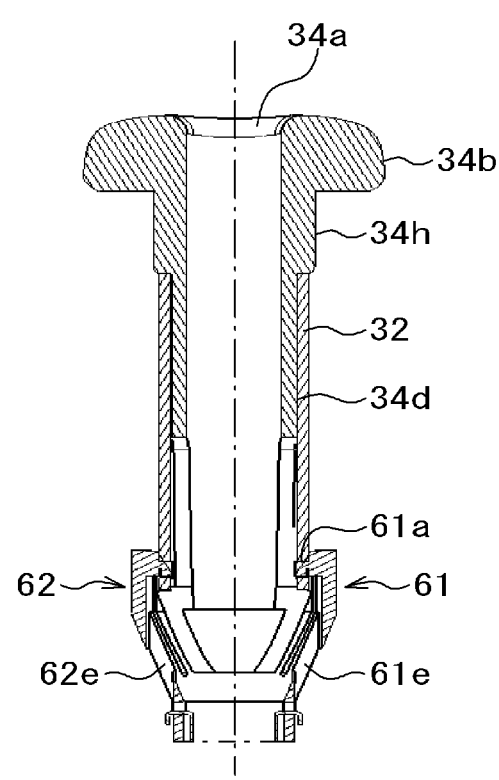

F I G. 15A    F I G. 15B
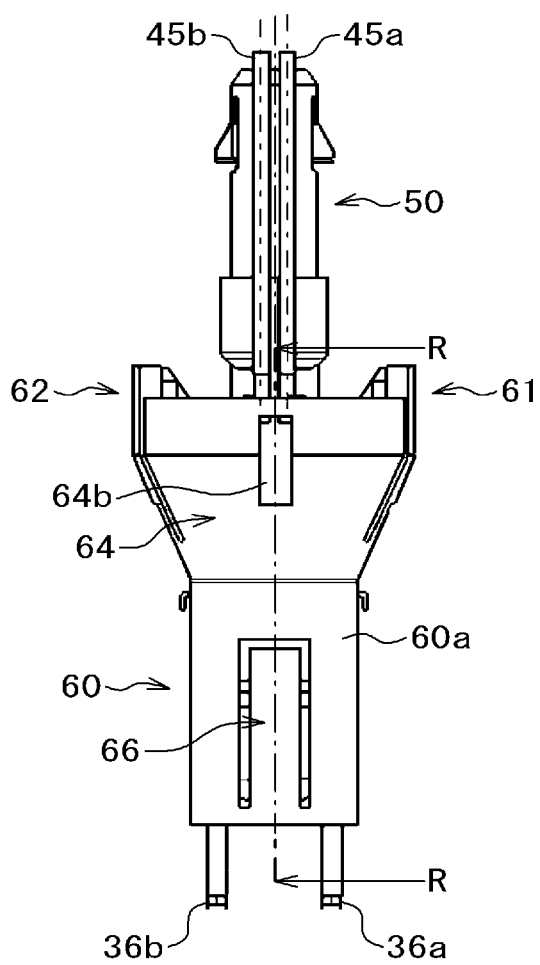
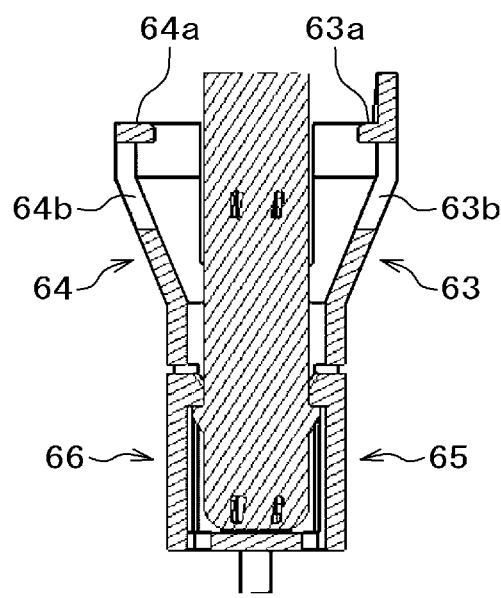

VEHICLE SEAT

BACKGROUND

The present invention relates to a vehicle seat and is applicable to, for example, a vehicle seat with a headrest incorporating an electric component therein.

As headrests of vehicle seats, there is one which incorporates electric components such as a TV monitor, a lighting equipment and the like. These electric components are connected to lead wires led into the headrest from the inside of a seatback and are electrified. Here, Japanese Unexamined Patent Application Publication No. 2008-49820 (Patent Literature 1) discloses one example of a lead wire connection structure to such a headrest. In this disclosure, a structure is taken in which a first connector constituting a connection terminal of a lead wire which is connected to an electric component arranged on the headrest side is coupled to a second connector constituting a connection terminal of a lead wire which is extended from a vehicle body side to be arranged on the seatback side.

Specifically, the first connector is provided to be pierced inside a headrest stay that is provided to fixedly mount the headrest on the seatback. This headrest stay is formed to pierce inside like a tube and holds the wire-passing first connector at its snout (an opening on a lower end side). On the other hand, the second connector is arranged at a lower portion of a headrest support into which the headrest stay is inserted to be held, and is held by a holder fixed integrally with the seatback. Thus, the second connector is in a standby state that the second connector is ready to be connected to the first connector held at the snout of the headrest stay when the headrest stay is then inserted into the headrest support. Here, the second connector is configured to come off from the engagement with the holder when pushed by an insertion force of the headrest stay after an insertion operation of the headrest stay connects the first connector to the second connector.

SUMMARY

However, in the vehicle seat disclosed in Patent Literature 1, the hold for holding the second connector is required beside the headrest support.

It is an object of the present invention to provide a vehicle seat capable of easily mounting a headrest having an electric component built therein.

Other objects and novel features of the present invention will become apparent from the description of the present disclosure and the accompanying drawings.

A typical one of the present disclosure will be briefly summarized as follows.

That is, a vehicle seat according to the present invention is equipped with a seatback having a seatback frame and a mounting portion fixed to the seatback frame, a seat cushion coupled to the seatback, a headrest having a headrest frame inserted into the mounting portion and an electric component, a first connector attached to the headrest frame and inserted into the mounting portion, and a second connector electrically connected to the first connector when the first connector is inserted into the second connector. The headrest frame has a hole engaged with the first connector. The mounting portion has a hole engaged with the second connector. The first connector has an engaging portion engaged with the hole of the headrest frame, a protrusion engaged with the second connector, and a first connection terminal electrically connected to a lead wire of the electric component. The second connector has a first engaging piece engaged with the hole of the mounting portion from the outside of the mounting portion, a second engaging piece engaged with the protrusion of the first connector from the outside of the first connector, and a second connector terminal electrically connected to the lead wire wired in the seatback and the first connector. The engagement between the hole of the mounting portion and the first engaging piece of the second connector can be released irreversibly.

BRIEF DESCRIPTION OF THE DRAWINGS

FIG. 13A is a view showing an important portion of the vehicle seat shown in FIG. 1 and is a side view in which a state that the female connector is mounted on a mounting portion is viewed from right;

FIG. 13B is a sectional view taken along the line F-F in FIG. 13A;

FIG. 15A is a view showing an important portion of the vehicle seat shown in FIG. 1 and is a rear view showing a state that the male connector and the female connector are connected;

FIG. 15B is a sectional view taken along the line R-R in FIG. 15A;

DESCRIPTION OF THE PREFERRED EMBODIMENT

Figure 1:
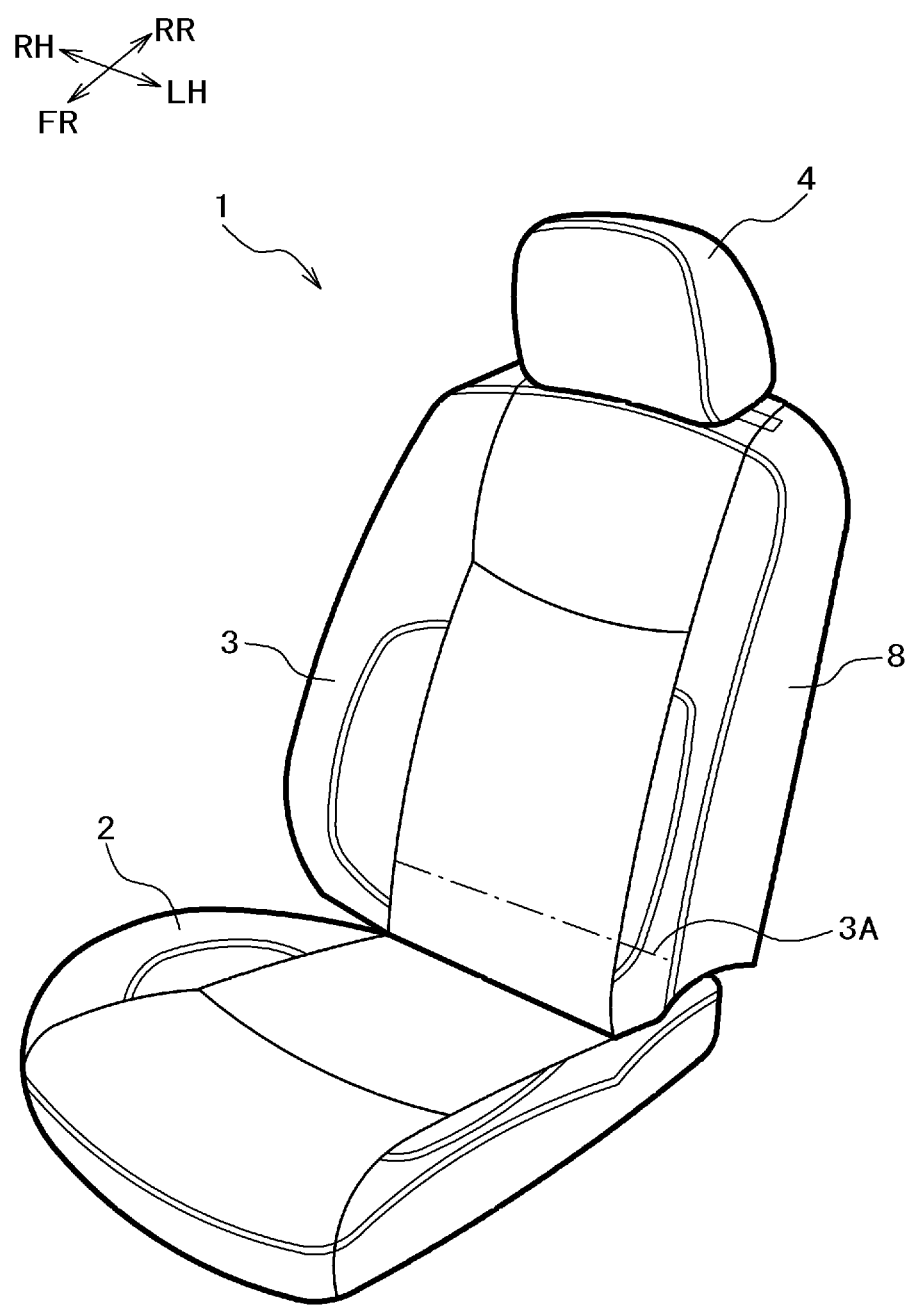
FIG. 1 is a perspective view of a vehicle seat in an embodiment according to the present invention.

Hereinafter, an embodiment will be described with reference to the accompanying drawings. In the following description, the same components will be given the same reference numerals throughout several views and will occasionally be omitted from being repetitively described. Incidentally, for more definite description, some of the drawings schematically show widths, thicknesses, shapes and the like of respective portions unlike those in an actual embodiment, and the drawings are only for the purpose of showing one example of the present invention and, therefore, should not be used as limitations in construing the present invention.
(Vehicle Seat)

The vehicle seat according to the present embodiment will be described with reference to FIG. 1. FIG. 1 is a perspective view of a vehicle seat according to the embodiment.

Incidentally, in the following description, the vertical direction is defined as an up-and-down direction on the basis of the case that a vehicle mounting a vehicle seat 1 is placed on a horizontal surface. Further, definition is given to make a front-rear direction (FR, RR) agree with the front-rear direction of the vehicle and to make a right-left direction (width direction) agree with the width direction of the vehicle. Symbol FR represents a forward direction of the vehicle, and symbol RR represents a rearward direction of the vehicle. Further, regarding the vehicle seat 1, description will be made to refer to the right and left sides as RH and LH respectively when the vehicle is viewed from the rear side.

As shown in FIG. 1, the vehicle seat 1 is equipped with a seat cushion 2 for an occupant to be seated, a seatback 3 upstanding at a rear end of the seat cushion 2, and a headrest 4 provided at an upper end portion of the seatback 3.

The seat cushion 2 is attached to a floor of the vehicle and can be provided with a mechanism which is capable of adjusting the position in the front-rear direction or the height position of the seat cushion 2.

The seatback 3 is a portion constituting a backrest and is coupled to the seat cushion 2 in the state that a pivot movement is possible about a pivot shaft (pivot centerline or pivot axis) 3A provided at a lower end portion. That is, the vehicle seat 1 is provided with a reclining function of tilting the seatback 3 rearward and a forward-folding function of folding the seatback 3 forward. Thus, the seatback 3 is configured to be pivotable relative to the seat cushion 2. Incidentally, in FIG. 1, the pivot axis 3A covered by a cushion material (not shown) and a cover 8 is shown by a dot-dash line.

The headrest 4 is mounted on the seatback 3 in a state that the height position of the headrest 4 is adjustable.

The seat cushion 2, the seatback 3 and the headrest 4 each take a construction that a frame constituting a skeleton member and a cushion material made of a formed resin and the like are provided inside and that the surface of the cushion material is covered with the cover 8.
(Headrest)

Figure 2:
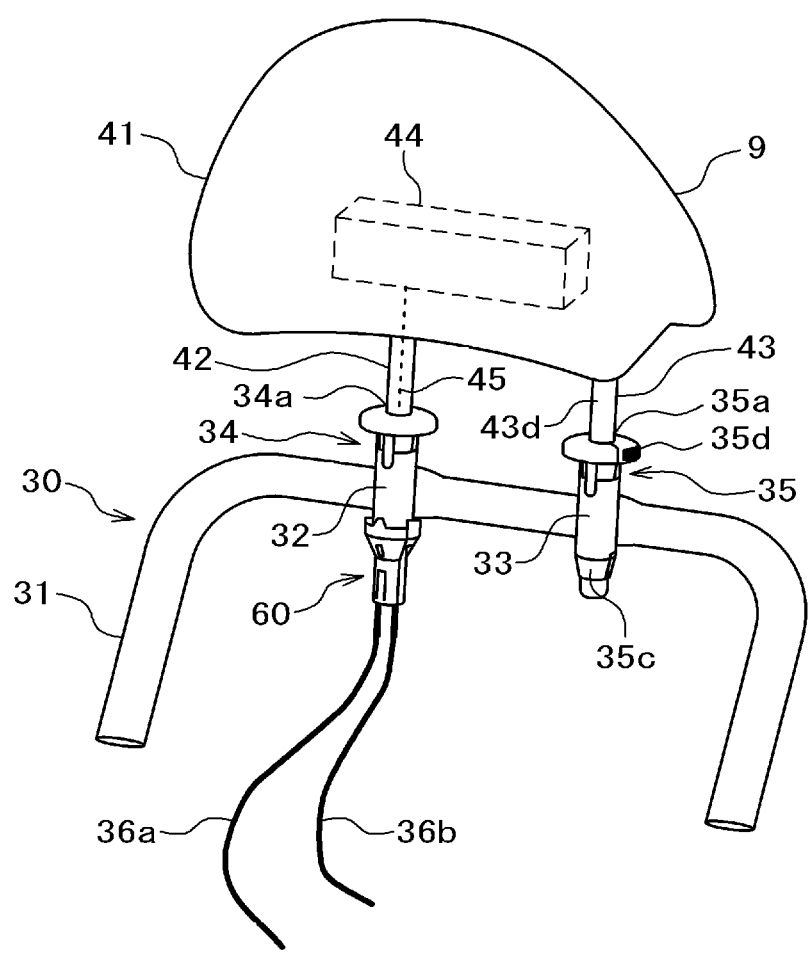
FIG. 2 is a view showing an important portion of the vehicle seat shown in FIG. 1 and is a perspective view showing a state that a headrest is mounted on a seatback frame.

The headrest will be described with reference to FIG. 2. FIG. 2 is a view showing an important portion of the vehicle seat shown in FIG. 1 and is a perspective view showing a state that the headrest is mounted on the seatback frame.

The headrest 4 is constructed by having a headrest form 41, headrest frames 42, 43 and an electric component 44 including a TV monitor, a lighting equipment or the like.

The seatback frame 30 constituting the skeleton of the seatback 3 is formed by bending a single pipe (a steel pipe (STKM13A being a steel pipe made of a medium carbon steel, for example)) and has an upper frame portion 31 at an upper portion of the seatback 3. Headrest guide sleeve brackets 32, 33 each being round-tubular are welded to the upper frame portion 31. Headrest guides 34, 35 are respectively attached to the headrest guide sleeve brackets (hereafter referred to simply as guide brackets) 32, 33 to constitute mounting portions. The headrest guides 34, 35 respectively have spigots 34a, 35a into which the headrest frames 42, 43 of the headrest 4 are insertable.
(Wire Harness Connector)

Figure 3:
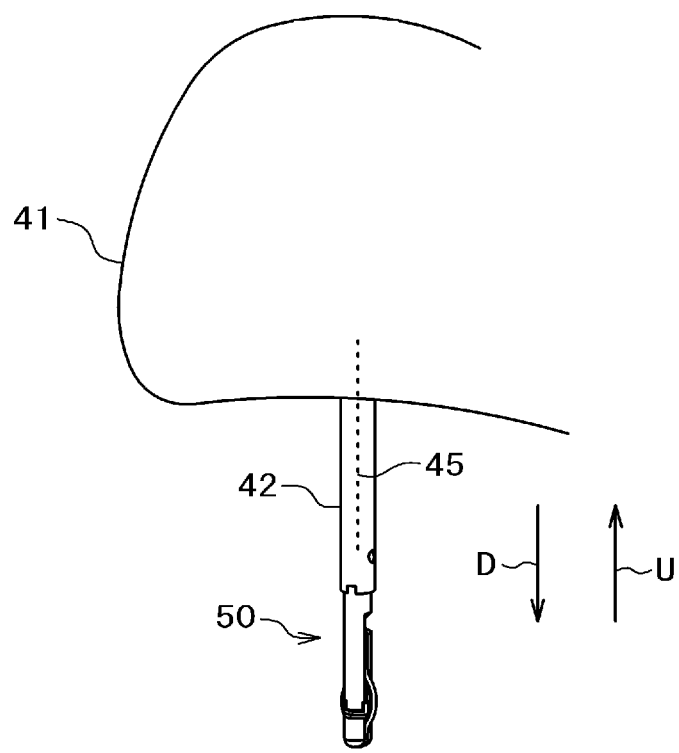
FIG. 3 is a view showing an important portion of the vehicle seat shown in FIG. 1 and is a perspective view showing a state that a male connector is attached to a headrest frame.
Figure 4:
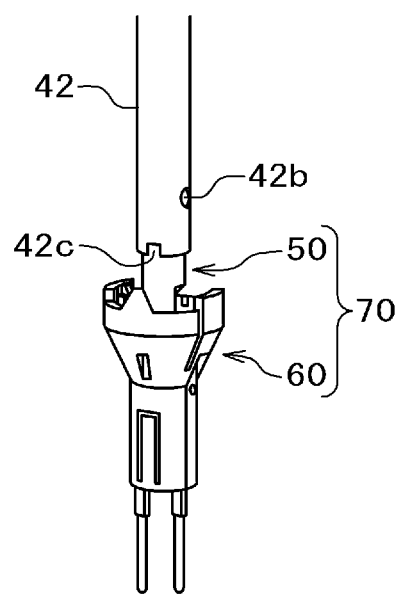
FIG. 4 is a view showing an important portion of the vehicle seat shown in FIG. 1 and a perspective view showing a state that the male connector is inserted into a female connector.
Figure 5:
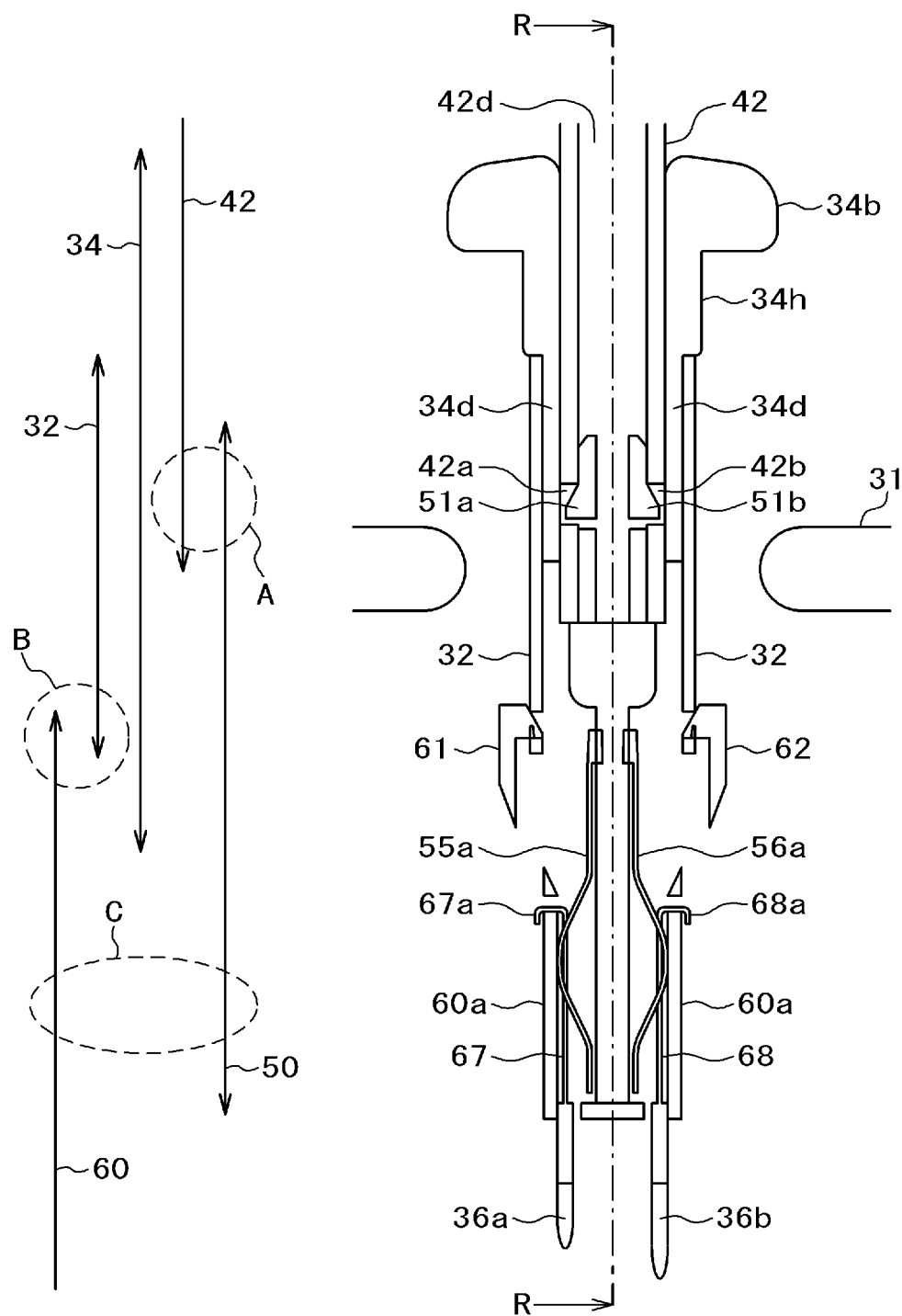
FIG. 5 is a view showing an important portion of the vehicle seat shown in FIG. 1 and is a sectional view showing a connection state of a wire harness connector.
Figure 6:
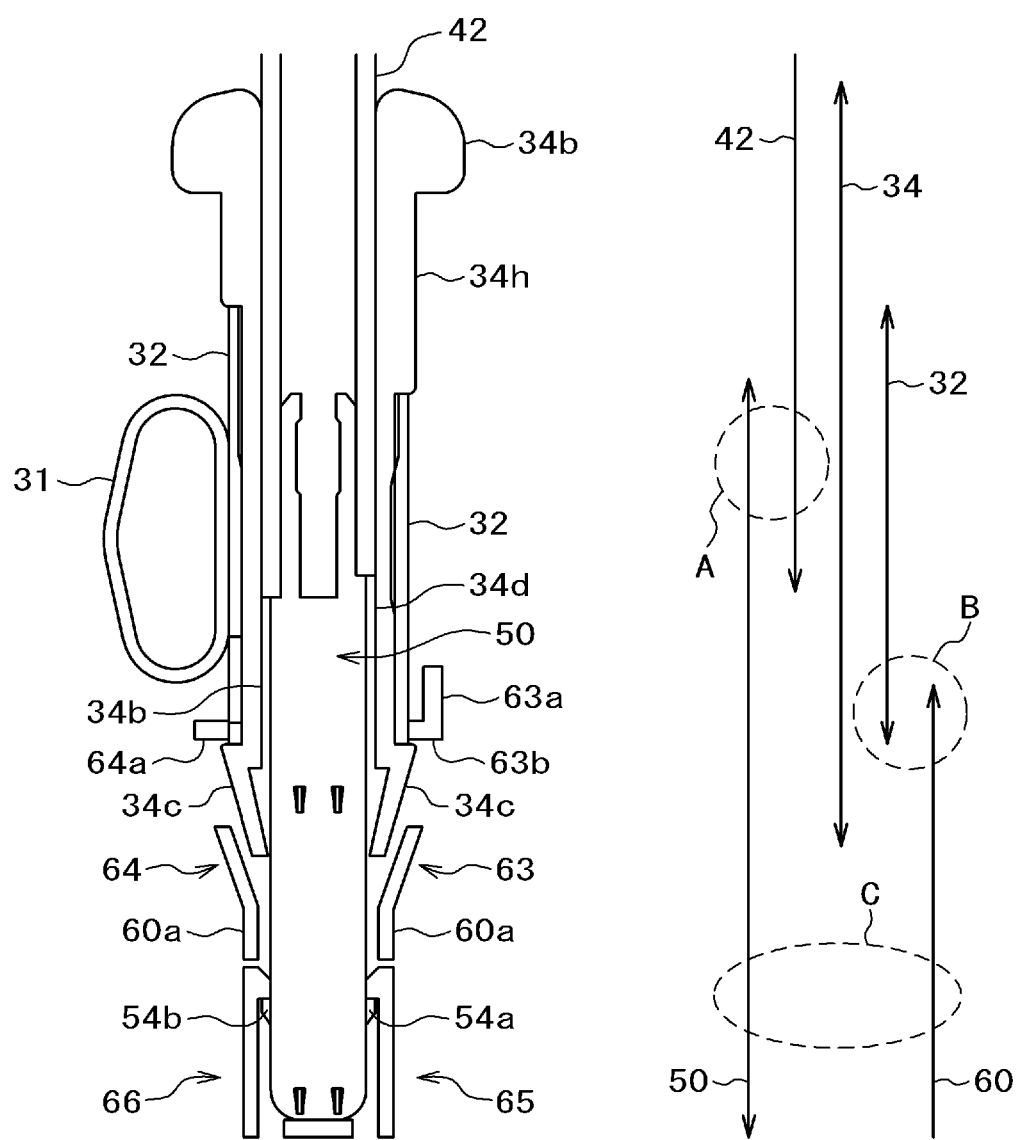
FIG. 6 is a longitudinal sectional view taken along the line R-R in FIG. 5.

A wire harness connector in the present embodiment will be described with reference to FIGS. 2, 3, 4, 5 and 6. FIG. 3 is a view showing an important portion of the vehicle seat shown in FIG. 1 and is a perspective view in which a state that a male connector is attached to a headrest frame is viewed from the front left. FIG. 4 is a view showing an important portion of the vehicle seat shown in FIG. 1 and is a perspective view in which a state that the male connector is inserted into a female connector is viewed from the front left. In the perspective view, the headrest frame, the guide brackets and the like on one side (i.e., left side) are omitted for better understanding. Each of FIG. 5 and FIG. 6 is a view showing an important portion of the vehicle seat and also showing the wire harness connector in a connection state. FIG. 5 is a sectional view as viewed from the front side, and FIG. 6 is a sectional view taken along the line R-R in FIG. 5.

As shown in FIG. 4, the wire harness connector 70 in the present embodiment is configured to have the male connector 50 and the female connector 60. As shown in FIG. 2, the wire harness connector 70 is to conductively connect lead wires 36a, 36b arranged inside the seatback 3 of the vehicle seat 1 to lead wires 45 arranged inside the headrest 4.

Here, the lead wires 45 arranged inside the headrest 4 are configured to be connected at terminal portions on the upper side to the electric component 44 built in the headrest 4. Further, as shown in FIG. 3, terminal portions on the lower side of the lead wires 45 inside the headrest frame 42 are connected to those of the male connector 50 in the state that the male connector 50 constituting a connection terminal of the lead wires 45 is inserted into the headrest frame 42. The male connector 50 is also called as a first connector.

On the other hand, as shown in FIG. 2, the lead wires 36a, 36b arranged inside the seatback 3 are configured to be connected to a power supply or the like on the vehicle body side at terminal portions on the lower side which are omitted from illustration. The lead wires 36a, 36b are led inside the seatback 3 and are attached to the seatback frame 30. The female connector 60 which constitutes a connection terminal for the lead wires 36a, 36b is connected to terminal portions on the upper side of the lead wires 36a, 36b. The female connector is also called as a second connector.

As shown in FIG. 4, the male connector 50 is inserted into the female connector 60 to make connection therebetween, so that the lead wires 45 can be connected conductively to the lead wires 36a, 36b. Then, once the male connector 50 is inserted into the female connector 60 to make the connection therebetween, the state of such connection can be kept. Accordingly, the lead wires 36a, 36b extended from the seatback 3 side on the vehicle body side and the lead wires 45 on the headrest 4 side can be kept in the conductively connected state.

Here, as shown in FIG. 3, the male connector 50 is attached to a lower portion of the headrest frame 42 which is on one side of the rod-like headrest frames 42, 43 provided integrally at a lower portion of the headrest 4. As shown in FIG. 2, these headrest frames 42, 43 are configured to be insertable respectively from the spigots 34a, 35a into the tubular headrest guides 34, 35 provided at the upper surface portion of the seatback 3. Accordingly, by inserting the headrest frames 42, 43, it is possible to keep the headrest 4 in a state of being mounted on the upper portion of the seatback 3. At the same time, it is possible to insert the male connector 50 attached to the lower portion of the headrest frame 42 into the inside of the spigot 34a.

On the other hand, the female connector 60 is held by a guide bracket 32 fixed to the upper frame portion 31 of the seatback 3. Specifically, as shown in FIG. 2, the guide bracket 32 is formed in an almost cylindrical shape as a whole and is able to hold the female connector 60 with its cylindrical portion inserted into the female connector 60. Thus, as shown in FIG. 2, the female connector 60 is placed on a position which is on an extension line of the spigot 34a, and is held in a standby state of waiting for the male connector 50 coming to be inserted thereinto.

As shown in FIG. 5 and FIG. 6, the headrest frame 42 and the male connector 50 are engaged at a place encircled by a dotted line circle A in the right-left direction, the guide bracket 32 and the female connector 60 are engaged at a place encircled by a dotted line circle B in the right-left direction, and the male connector 50 and the female connector 60 are engaged at a place encircled by a dotted line circle C in the front-rear direction. Incidentally, the arrows on the left side of the sectional view in FIG. 5 and the arrows on the right side of the sectional view in FIG. 6 show areas through which the headrest frame 42, the headrest guide 34, the guide bracket 32, the male connector 50 and the female connector 60 respectively extend in the longitudinal direction.

Hereinafter, the details of the aforementioned respective components will be described.

(Headrest Frames)

First of all, the headrest frames 42, 43 will be described with reference to FIG. 2, FIG. 4 and FIG. 5.

The headrest frames 42, 43 are formed by a steel pipe (STKM13A being made of a medium carbon steel, for example). As shown in FIG. 5, the headrest frame 42 on the side to which the male connector 50 is attached is formed at its rod-like interior with a lead through passage 42d capable of enabling the lead wires 45 to pierce. Further, as shown in FIG. 4 and FIG. 5, the headrest frame 42 is formed at a peripheral wall of a lower portion with holes 42a, 42b with which movable engaging claws 51a, 51b referred to later of the male connector 50 are respectively engageable. These holes 42a, 42b are formed at two places which are separated in the circumferential direction to face each other in the radial direction. A lower end of the headrest frame 42 is formed with a notch 42c which is used to position the male connector 50 as described later. Thus, as shown in FIG. 5, the headrest frame 42 is enabled to pierce the lead wires 45 inside and holds the male connector 50 engaged at the lower portion.

Further, the headrest frame 43 (refer to FIG. 2) on the other side is formed with a plurality of engaging grooves of a recess shape on its outer peripheral surface along the lengthwise direction. These engaging grooves 43d are provided at a circumferential position at which an engaging claw (not shown) is engageable. The engaging claw is provided to be able to protrude inside the spigot 35a of the headrest guide 35.

(Male Connector)

Figure 7:
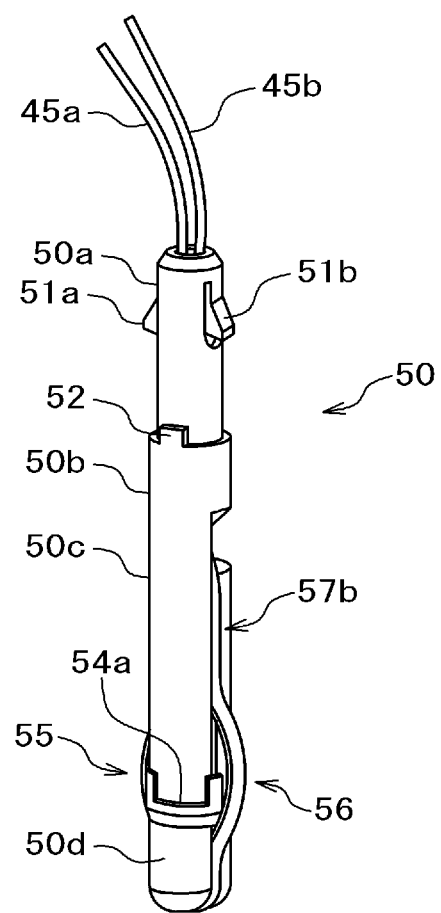
FIG. 7 is a perspective view of the male connector shown in FIG. 3.
Figure 8:
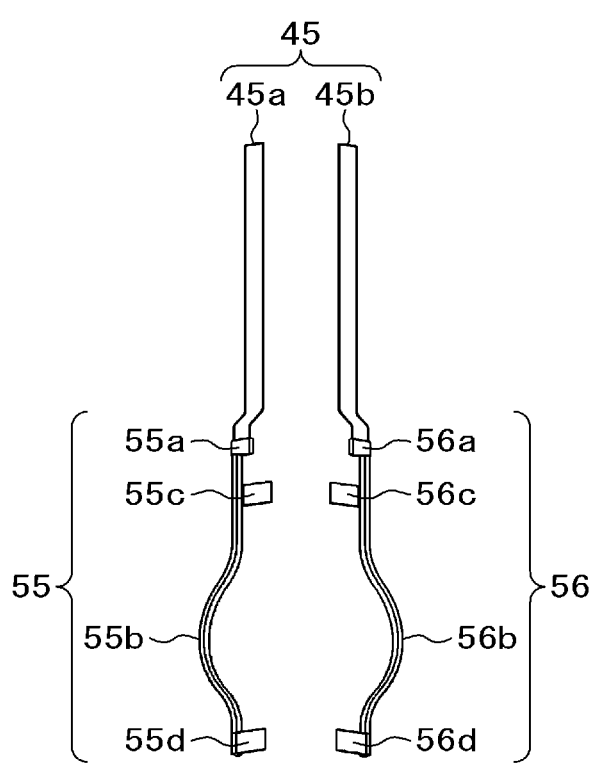
FIG. 8 is a schematic view showing connection terminals of the male connector shown in FIG. 7.
Figure 9A:
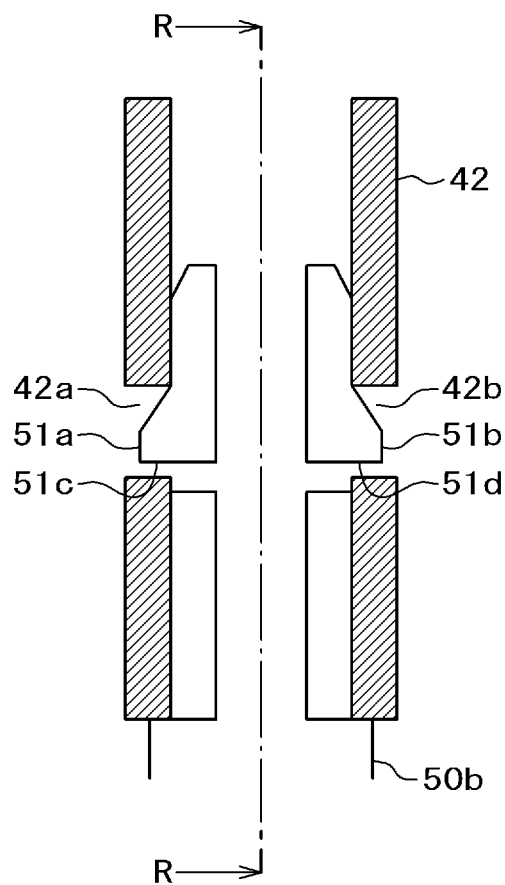
FIG. 9A is an enlarged sectional view of an important portion at a dotted line circle A in FIG. 5.
Figure 9B:
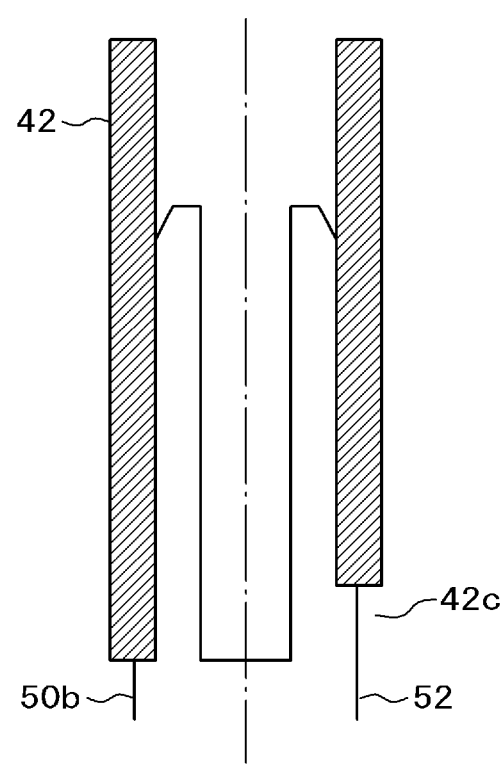
FIG. 9B is an enlarged sectional view of an important portion at a dotted line circle A in FIG. 6.
Figure 10:
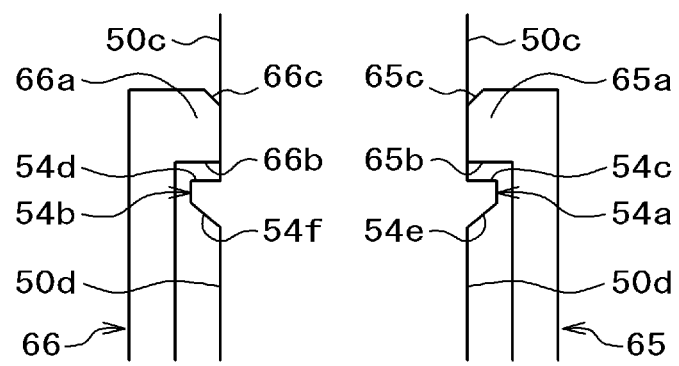
FIG. 10 is an enlarged sectional view of an important portion at a dotted line circle C in FIG. 6.

Next, the male connector 50 will be described with reference to FIGS. 5, 6, 7, 8, 9A, 9B and FIG. 10. FIG. 7 is a perspective view of the male connector 50 shown in FIG. 3 and is a view showing a state that lead wires on the electric component side have been connected. FIG. 8 is an illustration for explaining the connection terminals shown in FIG. 7. FIG. 9A is an enlarged sectional view of an important portion at the place encircled by the dotted line circle A in FIG. 5, and FIG. 9B is an enlarged sectional view of an important portion at the place encircled by the dotted line circle A in FIG. 6. FIG. 10 is an enlarged sectional view of an important portion at the place encircled by the dotted line circle C in FIG. 6.

As shown in FIGS. 5, 6, 7 and 8, the male connector 50 has movable engaging claws 51a, 51b, an engaging claw 52, protrusions 54a, 54b, and connection terminals 55, 56.

Here, except for the connection terminals 55, 56 which are formed by a conductor such as tin-coated brass or the like, the male connector 50 is integrally formed by a synthetic resin such as polybutylene terephthalate or the like. As shown in FIG. 5 and FIG. 6, the upper portion of the male connector 50 is formed to such a dimension that the whole of the upper portion falls within a range of the outer diameter of the headrest frame 42, and is held with itself attached to a lower portion of the headrest frame 42. Specifically, as shown FIGS. 5, 6, 7 and 9A, the male connector 50 is provided at opposite outer portions of the upper peripheral wall 50a with the movable engaging claws 51a, 51b of the shape protruding radially outward. These movable engaging claws 51a, 51b have an outer diameter therebetween formed to almost the same dimension as (slightly smaller than) the outer dimension of the headrest frame 42. Further, the claw shape of each movable engaging claws 51a, 51b takes a trapezoidal shape in the side view. Specifically, the movable engaging claws 51a, 51b are formed at their lower surfaces as abutment surfaces 51c, 51d which respectively abut on upward surfaces of the holes 42a, 42b. The movable engaging claws 51a, 51b are provided movably in the radial directions and are usually urged to protrude into the holes 42a, 42b.

As shown in FIG. 7 and FIG. 9B, at an outer side of the peripheral wall 50a below the movable engaging claws 51a, 51b, the male connector 50 is formed with an engaging claw 52 of the shape protruding radially outward. The outer diameter of the engaging claw 52 is formed to be almost the same dimension as (or slightly smaller than) the outer diameter of the headrest frame 42. The outer diameter of a peripheral wall 50b being lower than the engaging claw 52 is formed almost the same outer dimension as the engaging claw 52.

Further, the peripheral wall 50a of the male connector 50 is formed to a dimension that can be received in the lead through passage 42d of the headrest frame 42. Accordingly, by inserting the male connector 50 from the upper side of the same into the lead through passage 42d of the headrest frame 42 to engage the movable engaging claws 51a, 51b respectively with the holes 42a, 42b, it is possible to fix the male connector 50 to the lower portion of the headrest frame 42. Thus, even when it is simply tried to pull the male connector 50 downward from inside the headrest frame 42, the male connector 50 does not come off because the abutment surfaces 51c, 51d of the movable engaging claws 51a, 51b abut on the upward surfaces of the holes 42a, 42b.

In the state that the male connector 50 is engaged on the headrest frame 42, the male connector 50 is placed in a state that the peripheral wall 50b and the peripheral wall lower than the peripheral wall 50b are exposed from the lower end of the headrest frame 42. Thus, through the engagements of the movable engaging claws 51a, 51b with the holes 42a, 42b formed in the peripheral wall of the headrest frame 42, the male connector 50 is prevented from idling circumferentially inside the headrest frame 42 and is held not to fall out from the headrest frame 42. Further, since the engaging claw 52 being a protrusion protruding from the male connector 50 comes into and engages with a notch 42c formed at the lower end of the headrest frame 42 as shown in FIG. 4 and FIG. 7, the male connector 50 is positioned not to idle circumferentially inside the headrest frame 42 and, at the same time, is held not to inserted further inside the headrest frame 42.

As shown next in FIG. 7 and FIG. 8, the connection terminals 55, 56 are constituted by connection portions 55a, 56a connected physically and electrically to lead wires 45a, 45b constituting the lead wire 45, connection terminal portions 55b, 56b connected to connection terminals, referred to later, of the female connector 60, and protrusions 55c, 55d, 56c, 56d that are provided for securing the connection terminal portions 55b, 56b to slots 57a, 57b formed on the peripheral wall 50c.

The lead wires 45a, 45b are attached in the form that the lead wires 45a, 45b are fitted in a groove formed on a rear side of the peripheral walls 50a, 50b, 50c of the male connector 50, as shown in FIG. 15A. The connection terminal portion 55b is attached in such a manner that the protrusions 55c, 55d are inserted into holes of a slot 57a (not shown) formed on the right side of the peripheral walls 50c, 50d of the male connector 50, that upper and lower portions of the connection terminal portion 55b are fitted in the slot 57a and that a center portion of the connection terminal portion 55b protrudes from the peripheral walls 50c, 50d. The connection terminal portion 56b is attached in the form that the protrusions 56c, 56d are inserted into holes of a slot 57b formed on the left side of the peripheral walls 50c, 50d of the male connector 50, that upper and lower portions of the connection terminal portion 56b are fitted in the slot 57b and that a center portion of the connection terminal portion 56b protrudes from the peripheral walls 50c, 50d.

The connection terminals 55, 56 are configured to be connected in the state that the connection terminals 55, 56 can be respectively electrified by being inserted into an opening, referred to later, formed on the lower side of the female connector 60.

As shown next in the FIG. 6 and FIG. 7, the protrusions 54a, 54b are formed at a position between a position where the connection terminals 55, 56 protrude from the peripheral wall 50c and a position where the connection terminals 55, 56 protrude from the peripheral wall 50d. As shown in FIG. 10, the protrusions 54a, 54b are formed each as a shape protruding radially beyond the peripheral walls 50c, 50d. The shape of each of the protrusions 54a, 54b takes a trapezoidal shape in section as viewed in the side view. Here, the upper surfaces 54c, 54d of the protrusions 54a, 54b are formed to be perpendicular to the insertion direction D as abutment surfaces 54c, 54d which abut on the female connector 60 when the male connector 50 is engaged with the female connector 60. Further, outer side surfaces falling from outside-end lower portions of the abutment surfaces 54c, 54d are formed as taper surfaces 54e, 54f falling radially inward.

(Female Connector)

Figure 11:
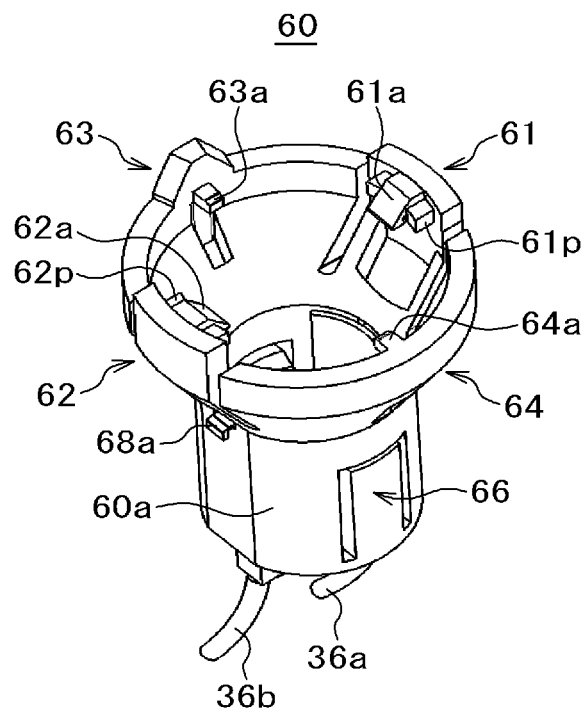
FIG. 11 is a perspective view of the female connector shown in FIG. 2.
Figure 12:
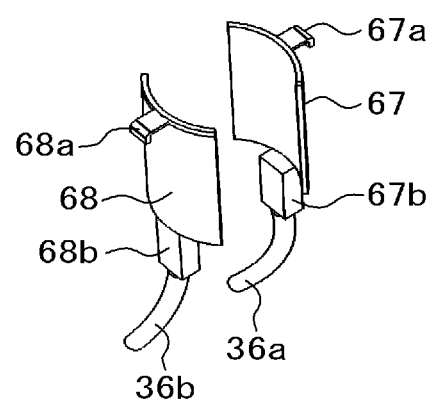
FIG. 12 is a perspective view of connection terminals of the female connector shown in FIG. 11.
Figure 14:
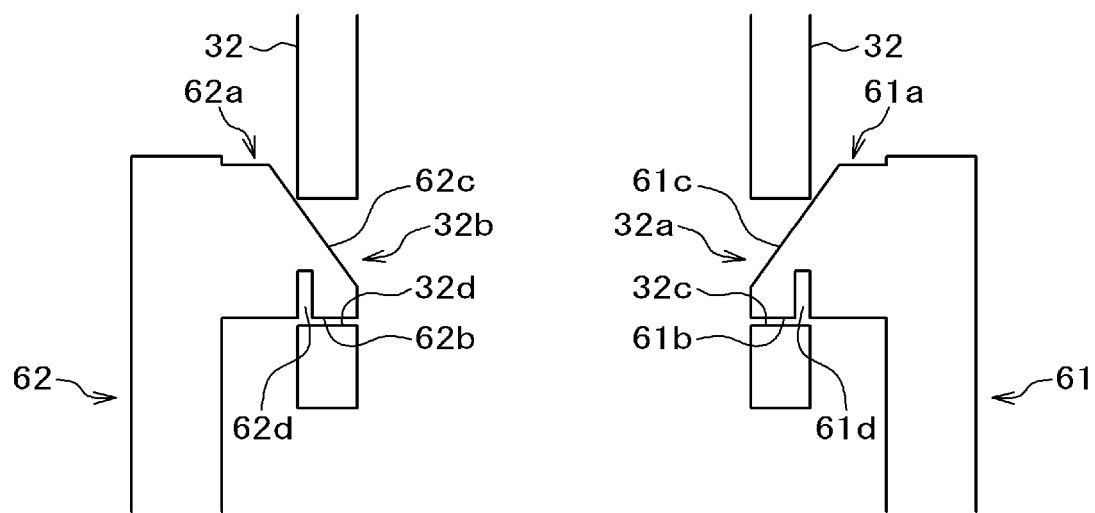
FIG. 14 is an enlarged sectional view of an important portion shown in FIG. 13B.

Next, the female connector 60 will be described with reference to FIGS. 11, 12, 13A, 13B, 14, 15A and 15B. FIG. 11 is a perspective view of the female connector 60 shown in FIG. 2 and is a view showing a state that the lead wires on the seatback 8 side are already connected. FIG. 12 is a perspective view showing connection terminals of the female connector 60 shown in FIG. 11. FIG. 13A is a view showing an important portion of the vehicle seat shown in FIG. 1 and is a side view in which a state that the female connector 60 is mounted on the mounting portion is viewed from right. FIG. 13B is a sectional view taken along the line F-F in FIG. 13A. FIG. 14 is an enlarged sectional view of an important portion shown in FIG. 13B. FIG. 15A is a view showing an important portion of the vehicle seat shown in FIG. 1 and is a rear view of the state that the male connector 50 and the female connector 60 are connected. FIG. 15B is a sectional view taken along the line R-R in FIG. 15A.

As shown in FIG. 11, FIG. 12 and FIG. 13A, the female connector 60 has first engaging pieces 61, 62, abutment pieces 63, 64, second engaging pieces 65, 66, and connection terminals 67, 68.

Here, like the male connector 50, the female connector 60 is integrally formed by a synthetic resin such as polybutylene terephthalate or the like except for the connection terminals 67, 68, which are each formed by a conductor such as tin-coated brass or the like. The female connector 60 has a flexibility which enables the female connector 60 to be engaged elastically with the guide bracket 32 and the male connector 50. As shown in FIGS. 13A and 13B, in an ordinary state before the male connector 50 is inserted and connected with the female connector 60, the same is held in the engaged state with the guide bracket 32.

Specifically, as shown in FIG. 11, FIG. 13B and FIG. 15A, the female connector 60 is formed with the first engaging pieces 61, 62 at two places which radially face each other at an upper position of the peripheral wall 60a. These first engaging pieces 61, 62 are formed to spread the upper sides radially outward and to direct engaging claws 61a, 62a and protrusions 61p, 62p radially inward. The engaging claws 61a, 62a are engageable with the guide bracket 32, and the protrusions 61p, 62p abut on the guide bracket 32. Further, the first engaging pieces 61, 62 are formed with openings 61e, 62e at their center portions and have their lower end portions integrated with the peripheral wall 60a. Thus, the first engaging pieces 61, 62 enable their free ends on the upper side to be deformed radially inward and outward about their lower end portions. As shown in FIG. 14, the engaging claws 61a, 62a are respectively brought into engagements with rectangular holes 32a, 32b from the outside of the guide bracket 32, and the holes 32a, 32b are formed in the peripheral wall surface of the guide bracket 32. Therefore, the female connector 60 is brought into a hold state in which the female connector 60 is restricted from relative movement in the insertion direction D relative to the guide bracket 32.

Here, as shown in FIG. 14, a claw shape of the engaging claws 61a, 62a takes a trapezoidal shape in section as viewed in the side view. Specifically, the bottom surfaces of the engaging claws 61a, 62a are formed as abutment surfaces 61b, 62b that respectively abut on upward surfaces (abutment surfaces 32c, 32d) of the holes 32a, 32b of the guide bracket 32. These abutment surfaces 61b, 62b and abutment surfaces 32c, 32d are formed to be perpendicular to the insertion direction D. Accordingly, the movement in the insertion direction D of the female connector 60 relative to the guide bracket 32 is restricted by the abutments between the abutment surfaces 61b, 62b and the abutment surfaces 32c, 32d which are all directed to be perpendicular to the insertion direction D. Further, inside surfaces which rise from upper portions on radially insides of the abutment surfaces 61b, 62b are formed as taper surfaces 61c, 62c each rising radially outward.

The aforementioned engaging claws 61a, 62a are respectively engaged with the holes 32a, 32b of the guide bracket 32 in a free state (the state shown in FIG. 14) that the first engaging pieces 61, 62 is not flexurally deformed in the radial direction. In this engagement state, the engaging claws 61a, 62a are in a state that their end-side portions have been putted on the abutment surfaces 32c, 32d of the holes 32a, 32b, and are in a state of abutment on the holes 32a, 32b in the insertion direction D.

Further, slits 61d, 62d are formed that respectively extend upward from outside portions (from the vicinity of the outer wall of the guide bracket 32) of the abutment surfaces 61b, 62b. The slits 61d, 62d each have a function of weakening the strength in the insertion direction D of the engaging claws 61a, 62a. Thus, when the headrest 4 is further pushed in the insertion direction D after the male connector 50 is connected to the female connector 60, the engaging claws 61a, 62a are broken to enable the female connector 60 to be left from the guide bracket 32.

As shown in FIG. 11, the protrusions 61p, 62p are arranged at both sides of a corresponding one of the engaging claws 61a, 62a and are made to abut on the outer wall of the guide bracket 32.

Further, as shown in FIG. 11, FIG. 13A and FIG. 15B, the female connector 60 is formed with abutment pieces 63, 64 at an upper end portion of the peripheral wall 60a and at two places which radially face each other between the first engaging pieces 61, 62. These abutment pieces 63, 64 are formed to extend upper portions radially outward and to direct protrusions 63a, 64a which abut on the guide bracket 32, radially inward. Openings 63b, 64b being smaller than the openings 61e, 62e are formed under the protrusions 63a, 64a, respectively, and lower end portions of both of the openings 63b, 64b are integrated with the peripheral wall 60a. The abutment pieces 63, 64 are separated by slits from the first engaging pieces 61, 62, and the circumferential length of each of the abutment pieces 63, 64 is made to be longer than that of the first engaging pieces 61, 62. Thus, the abutment pieces 63, 64 enable free ends on the upper side to be elastically deformable radially inward and outward about their lower end portions. However, the abutment pieces 63, 64 are restrained to be smaller than the first engaging pieces 61, 62 in the amount of elastic deformation.

Further, as shown in FIG. 5, FIG. 11 and FIG. 12, the female connector 60 has connection terminals 67, 68 attached to two places which radially face each other on an inner peripheral surface of the peripheral wall 60a. The connection terminals 67, 68 are formed at their upper ends with claws 67a, 68a directed radially outward, and the claws 67a, 68a are respectively engaged in holes (refer to FIG. 5) of the peripheral wall 60a. The connection terminals 67, 68 are formed at their lower ends with connection portions 67b, 68b which are connected physically and electrically to the lead wires 36a, 36b, respectively.

Further, as shown in FIG. 11, FIG. 15A and FIG. 15B, the female connector 60 is provided with two inverted U-shape notches at two radially facing places of the peripheral wall 60a to foim second engaging pieces 65, 66. Engaging claws 65a, 66a engaged with the male connector 50 are formed on these second engaging pieces 65, 66 to be directed radially inward (refer to FIG. 10). Lower end portions of both of the second engaging pieces 65, 66 are made integrally with the peripheral wall 60a. Thus, the second engaging pieces 65, 66 enable free ends on the upper side to be elastically deformable radially inward and outward about their lower end portions. As shown in FIG. 10, these engaging claws 65a, 66a are brought into engagements with the protrusions 54a, 54b formed on the peripheral wall surface of the male connector 50, from the outside of the male connector 50. Thus, the female connector 60 becomes a holding state that the movement relative to the male connector 50 in the insertion direction D is restricted.

Here, as shown in FIG. 10, the shape of the engaging claws 65a, 66a takes an almost rectangular shape in section as viewed in the side view. Specifically, the engaging claws 65a, 66a make their bottom surfaces as abutment surfaces 65b, 66b which abut on the upper surfaces (abutment surfaces 54c, 54d) of the protrusions 54a, 54b. Further, inside surfaces rising from inside upper portions of the engaging claws 65a, 66a are formed as taper surfaces 65c, 66c rising radially outward, respectively. The abutment surfaces 65b, 66b and the abutment surfaces 54c, 54d are formed to be perpendicular to the insertion direction D. Accordingly, the movement in the insertion direction D of the female connector 60 relative to the male connector 50 is restricted by the abutments between the abutment surfaces 65b, 66b and the abutment surfaces 54c, 54d which are directed to be perpendicular to the insertion direction D.

The aforementioned engaging claws 65a, 66a are respectively engaged with the protrusions 54a, 54b of the male connector 50 in a free state (the state shown in FIG. 10) that the second engaging pieces 65, 66 are not elastically deformed in the radial direction. In this engagement state, the engaging claws 65a, 66a have their end-side portions riding on the abutment surfaces 54c, 54d of the protrusions 54a, 54b and are held in contact with the protrusions 54a, 54b in the insertion direction D.

Accordingly, when the male connector 50 is inserted into the female connector 60, the engaging claws 65a, 66a of the female connector 60 are pressed outward to be displaced to open radially outward. Thus, when the male connector 50 is completely inserted into the female connector 60, the engaging claws 65a, 66a pass through the protrusions 54a, 54b and come onto the upper surfaces of the protrusions 54a, 54b to be engaged with the same by the restoring force of the second engaging pieces 65, 66. At this time, the outside surfaces of the connection terminal portions 55b, 56b of the male connector 50 are brought into abutment with inside surfaces of the connection terminals 67, 68 of the female connector 60. As a result, the female connector 60 is brought into engagement with the male connector 60 and becomes a connected state of being conductive. In this connection state, the abutment surfaces 65b, 66b of the female connector 60 that are directed to be perpendicular to the insertion direction D are received by the abutment surfaces 54c, 54d of the male connector 50 that are directed to be perpendicular likewise. Accordingly, through the abutments between the abutment surfaces 65b, 66b of the female connector 60 and the abutment surfaces 54c, 54d of the male connector 50, the female connector 60 can be held by a strong force not to fall out of the male connector 50. Further, in this connection state, as shown in FIG. 15B, a lower end wall of the female connector 60 is held in abutment on a lower end portion of the male connector 50 in the insertion direction D. Accordingly, in this connection state, it results that the female connector 60 is also pressed in the insertion direction D when the male connector 50 is pressed further in the insertion direction D.

(Guide Brackets)

The guide brackets 32, 33 will be described with reference to FIGS. 2, 5, 6 and 14.

The guide brackets 32, 33 are each formed by a steel pipe such as, for example, SPHC (Steel Plate Hot Commercial) and the like and each take a cylindrical shape as a whole. The rectangular holes 32a, 32b are formed at two places which radially face each other at the lower portion of the peripheral wall of the guide bracket 32 taking a cylindrical shape. The guide brackets 32, 33 are fixed to a horizontal portion of the upper frame portion 31.

(Headrest Guides)

Figure 16:
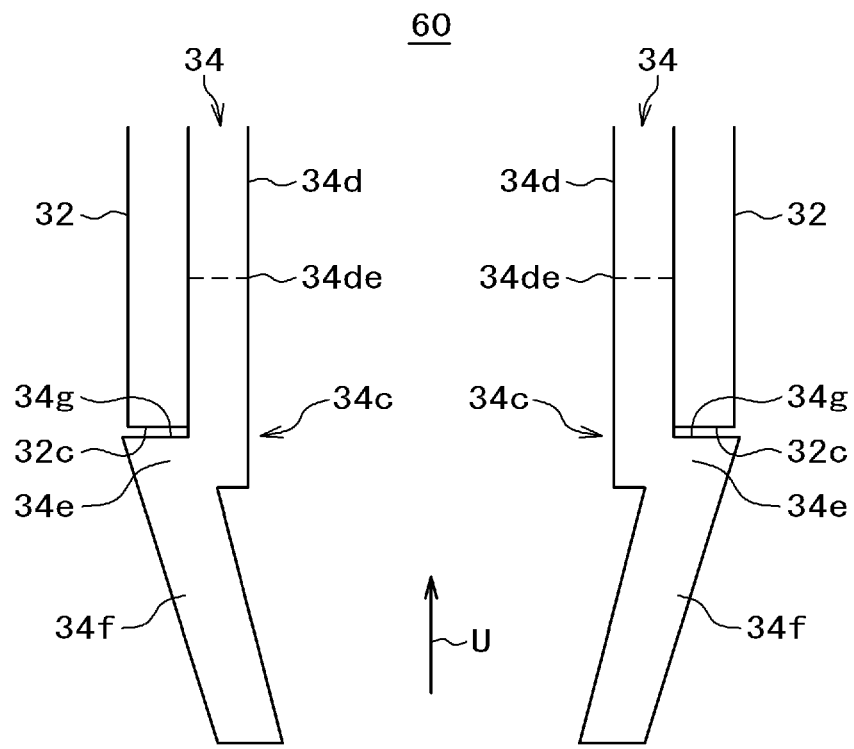
FIG. 16 is a sectional view of an important portion shown in FIG. 6.
Figure 17:
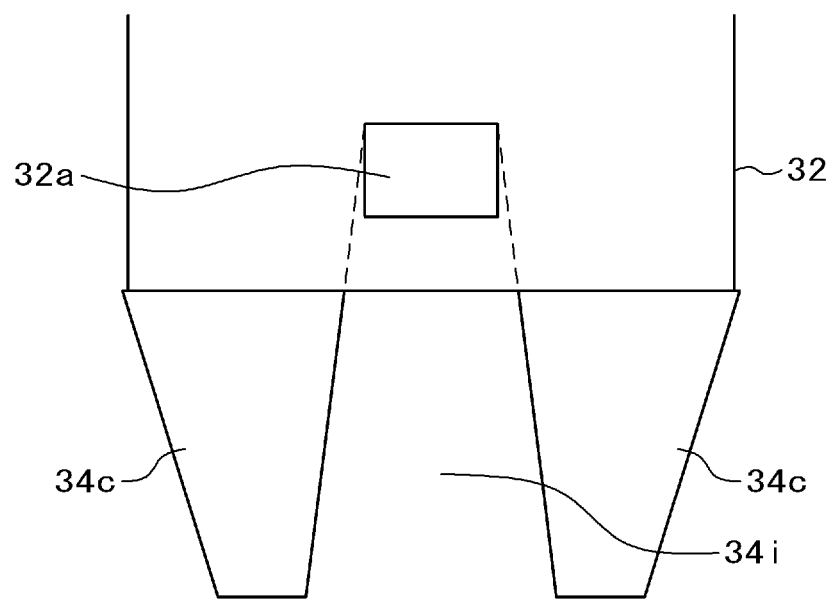
FIG. 17 is a side view corresponding to the sectional view shown in FIG. 16.

Next, the headrest guides 34, 35 will be described with reference to FIGS. 2, 5, 6, 13A, 13B, 16 and 17. FIG. 16 is a sectional view of an important portion shown in FIG. 6. FIG. 17 is a side view corresponding to the sectional view shown in FIG. 16.

As shown in FIG. 2 and FIG. 6, the headrest guides 34, 35 have head portions 34b, 35b and leg portions 34c, 35c, respectively (35b, 35c are not shown in FIG. 6).

Here, the headrest guide 34 is integrally formed by a synthetic resin such as, for example, polypropylene or the like and takes an almost cylindrical shape as a whole. As shown in FIG. 17, notches 34i are formed at a lower end 34de of the peripheral wall 34d forming the cylindrical shape, and thus, the leg portions 34c are formed at two places of the lower end 34de which radially face each other.

As shown in FIG. 16, these leg portions 34c have their upper end portions integrated with the peripheral wall 34d. Thus, the leg portions 34c are able to elastically deform their free ends on the lower side radially inward and outward. Here, as shown in FIG. 16, the leg portions 34c are formed with engagement portions 34e protruding radially outward at portions which are under the lower end of the guide bracket 32. In a free state (the state shown in FIG. 16) that the leg portions 34c is not elastically deformed, the engagement portions 34e are formed so that the outer diameter encompassing the engagement portions 34e is almost the same dimension as (or slightly larger than) the outer diameter of the guide bracket 32. Then, taper portions 34f are formed which become narrower radially inward from the engagement portions 34e toward the lower side. Then, the inner diameter at lower ends of the taper portions 34f is formed to be smaller than the inner diameter of the peripheral wall 34d.

Specifically, upper surfaces of the engagement portions 34e are made as abutment surfaces 34g which abut on the lower end surface (abutment surface 32c) of the guide bracket 32. These abutment surfaces 34g and the abutment surface 32c are formed to be perpendicular to the insertion direction D. Accordingly, the relative movement of the headrest guide 34 to the guide bracket 32 in the arrow U direction indicated in FIG. 16 is restricted by a strong force through abutments between the abutment surfaces 34g and the abutment surface 32c which are directed perpendicularly to the arrow U direction.

That is, when the headrest guide 34 is inserted into the guide bracket 32, the leg portions 34c of the headrest guide 34 are pressed inward and are deformed radially inward. Thus, after the headrest guide 34 is completely inserted into the guide bracket 32, the leg portions 34c enter under the abutment surface 32c to be engaged with the same thanks to their restoring forces. This prevents the inserted headrest guide 34 from coming off.

As shown in FIG. 5 and FIG. 6, the headrest guide 34 is fixedly held by the guide bracket 32 through the insertion of the peripheral wall 34d and the engagements of the leg portions 34c with respect to the guide bracket 32. An assembly in which the headrest guide 34 is inserted into and fixed to the guide bracket 32 as shown in FIG. 13A and FIG. 16 is called the mounting portion 37.

The leg portions 35c of the headrest guide 35 are configured similarly to the leg portions 34c.

A neck portion 34h is formed at an upper end of the peripheral wall 34d taking a cylindrical shape. The shape of the neck portion 34h is cylindrical. As shown in 13B, the neck portion 34h is integrated at its lower end portion with the peripheral wall 34d. Here, as shown in FIG. 13B, the inner diameter of the neck portion 34h is the same as that of the peripheral portion 34d, while the outer diameter is formed to be larger than the outer diameter of the guide bracket 32. A neck portion 35h (35h not shown) of the headrest guide 35 is configured similarly to the neck portion 34h.

A head portion 34b is formed at an upper end of the neck portion 34h. The shape of the head portion 34 is cylindrical. As shown in FIG. 13B, the head portion 34b is integrated at its lower end portion with the neck portion 34h. Here, as shown in FIG. 13B, the inner diameter of the head portion 34b is the same as that of the peripheral wall 34d, while the outer diameter is formed to be larger than the outer diameter of the neck portion 34h.

As described before, the head portion 35b of the headrest guide 35 has the engaging claw. Here, the engaging claw is usually biased to protrude inside the spigot 35a. Accordingly, when the insertion of the headrest frame 43 into the headrest guide 35 brings one of the engaging grooves 43d to the same height as the engaging claw, the same is engaged with the one engaging groove 43d automatically. Thus, the headrest frame 43 is restrained from being moved in the insertion direction D and the coming-off direction U, so that the headrest 4 can be held in a state of being fixedly mounted on the seatback 3. Incidentally, when an adjusting knob 35d (refer to FIG. 2) provided integrally with the engaging claw is operated to be pushed, the engaging claw is moved against the aforementioned bias to be withdrawn to the outside (the head portion 35b) of the spigot 35a. Thus, it is possible to switch the engaging claw to a state of being unable to be engaged with any of the engaging grooves 43d. That is, it becomes possible to allow the movement of the headrest frame 43 in any of the insertion direction D and the opposite direction U.

(Manufacturing Method for Vehicle Seat)

Figure 18:
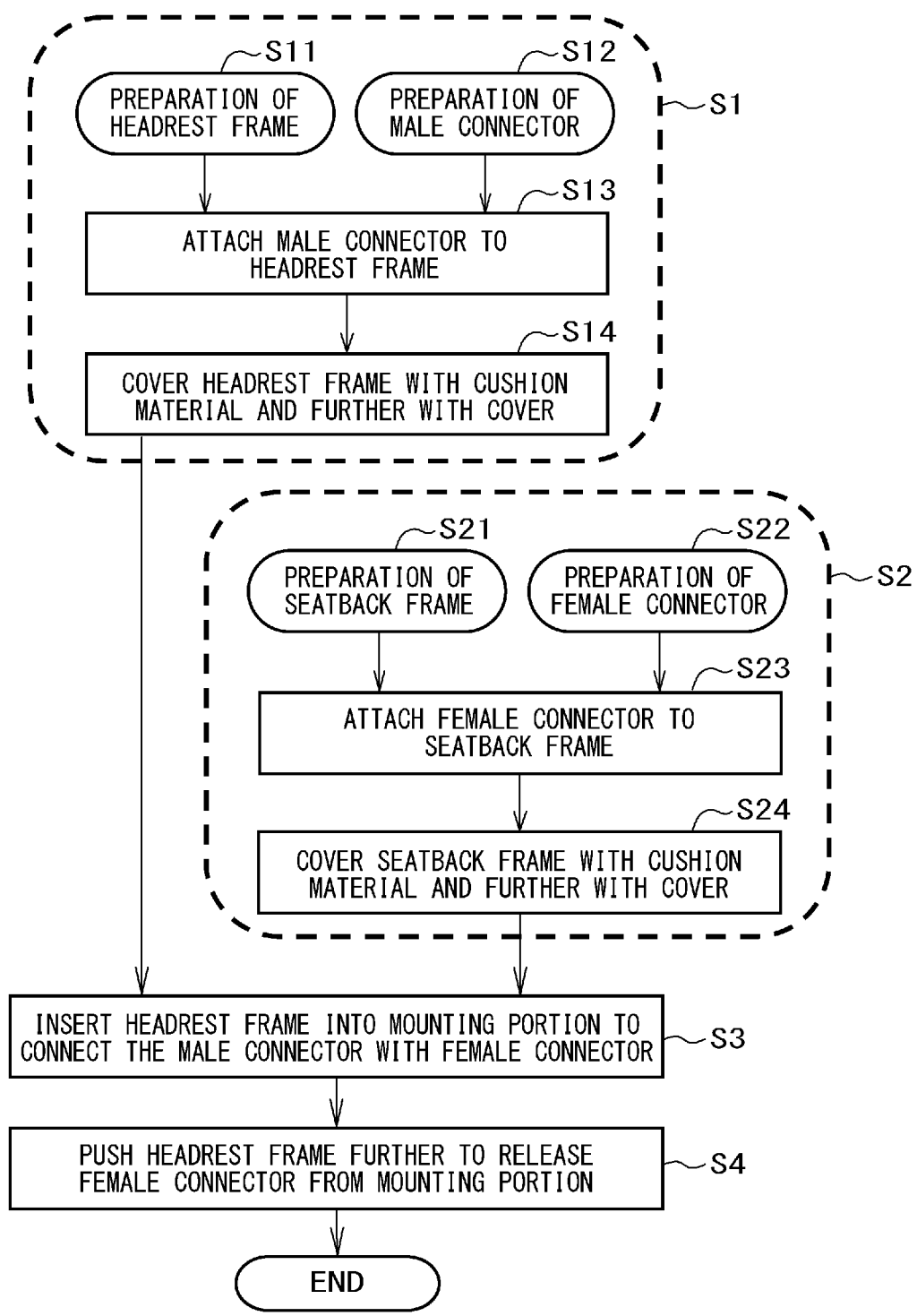
FIG. 18 is a flowchart showing a manufacturing method for the vehicle seat shown in FIG. 1.

Next, a manufacturing method for the vehicle seat in the present embodiment will be described with reference to FIG. 18. FIG. 18 is a flowchart showing the manufacturing method for the vehicle seat shown in FIG. 1.

(A) In the first place, the headrest 4 is prepared (step S1). Specifically, the headrest frames 42, 43 and the electric component 44 are prepared (step S11), and the male connector 50 is prepared (step S12). Here, the headrest frames 42, 43 are a pair of right and left vertical frame portions which are formed, for example, by bending a single pipe made of metal.

Then, the male connector 50 is attached to the headrest frame 42 (step S13). The step S13 will hereafter be described in detail.

The lead wires 45a, 45b in the headrest frame 42 are physically connected by caulking or swaging and electrically connected to the connection portions 55a, 56a of the connection terminals 55, 56 of the male connector 50.

Further, parts of the lead wires 45*a*, 45*b* are secured by being fitted in the groove formed in the rear side of the male connector 50. When the male connector 50 is inserted into the headrest frame 42, the movable engaging claws 51*a*, 51*b* are moved radially inward to be pushed back to the position of the outer wall of the peripheral wall 50*a*. As soon as the male connector 50 is inserted to a predetermined position in the headrest frame 42, the movable engaging claws 51*a*, 51*b* are restored to be engaged with the holes 42*a*, 42*b*, and the engaging claw 52 is engaged with the notch 42*c*. Thus, the headrest frame 42 and the male connector 50 become a connection state through the insertion operation, and the lead wires 45 and the male connector 50 are enabled to conduct electricity.

After this, the cushion material (not shown) is covered on the headrest frames 42, 43 and the electric component 44, and the cover 9 is then covered (step S14). Here, the headrest frames 42, 43 and the electric component 44 may be received within a bag-like cover, and forming material may then be injected into the cover, so that the cushion material may be formed by an integral skin foam molding method.

(B) Then, the seatback 3 is prepared (step S2).

Specifically, the seatback frame 30 which is configured by welding the guide brackets 32, 33 to the upper frame portion 31 is prepared (step S21). The lead wires 36*a*, 36*b* have been attached to the seatback frame 30. Further, the female connector 60 is prepared (step S22).

Next, the female connector 60 is attached to the seatback frame 30 (step S23). The step S23 will hereinafter be described in detail.

The lead wires 36*a*, 36*b* attached to the seatback frame 30 are connected physically by caulking to the connection portions 67*a*, 68*b* of the connection terminals 67, 68 of the male connector 60 and are also connected thereto electrically. When the female connector 60 is pushed with itself abutted on the lower end of the guide bracket 32, the engaging claws 61*a*, 62*a* are bent radially outward. When the female connector 60 is pushed to a predetermined position against the guide bracket 32, the engaging claws 61*a*, 62*a* are restored to be engaged with the holes 32*a*, 32*b*. Thus, the guide bracket 32 and the female connector 60 become a connected state and are attached to the seatback frame 30.

Thereafter, the seatback frame 30 is covered with the cushion material (not shown), and the cover 8 is covered (step S24). Then, the headrest guides 34, 35 are inserted into the guide brackets 32, 33 to be fixed.

(C) Subsequently, the headrest frames 42, 43 are inserted into the headrest guides 34, 35, whereby the male connector 50 and the female connector 60 are connected (step S3). Step S3 will then be described in detail.

When the male connector 50 is inserted into the female connector 60, the protrusions 54*a*, 54*b* push the engaging claws 65*a*, 66*a* radially outward, and the engaging claws 65*a*, 66*a* are displaced to open. Then, when the male connector 50 becomes a state of being completely inserted into the female connector 60 as shown in FIG. 10, the engaging claws 65*a*, 66*a* are restored to be engaged with the protrusions 54*a*, 54*b*, and at the same time, the connection terminals 55, 56 are connected to the connection terminals 67, 68. As a result, the male connector 50 and the female connector 60 become an insert connection state and are enabled to conduct electricity.

(D) Then, the headrest frames 42, 43 are further pushed to release the female connector 60 from the mounting portion 37 (step S4). Step S4 will then be described in detail.

When the headrest frames 42, 43 are further moved in the insertion direction D from the state that the male connector 50 and the female connector 60 are connected at step S3, it is possible to release the female connector 60 from the guide bracket 32 in the state that the male connector 50 and the female connector 60 remain connected. At this time, the engaging claws 61*a*, 62*a* of the female connector 60 are broken, whereby the female connector 60 is released from the guide bracket 32 irreversibly. As a result, the headrest frames 42, 43 are allowed to be moved in the insertion direction D and the opposite direction U, and hence, it becomes possible to adjust the height of the headrest 4.

Incidentally, the inner diameters of the upper ends of the first engaging pieces 61, 62 and the abutment pieces 63, 64 are larger than the outer diameter of the guide bracket 32. Thus, when the headrest frame 42 is moved in the direction U, the movement of the female connector 60 is stopped because the lower end of the guide bracket 32 abuts on the female connector 60. Further, because the male connector 50 and the female connector 60 remain engaged, and because the headrest frame 42 and the male connector 50 remain engaged, the headrest frame 42 cannot be withdrawn to come off the headrest guide 34. Thus, it is possible to prevent the headrest frame 42 from coming out.

<Modifications>

Hereafter, a typical modification will be exemplified. In the following description of the modification, portions which have the same configurations and functions as those having been described in the foregoing embodiment will be given the same reference numerals as those used in the foregoing embodiment. Therefore, the description in the foregoing embodiment will be suitably applied to the description of such portions unless inconsistency arises technologically. Further, a part of the foregoing embodiment and all or a part of the modification are suitably applicable in combination unless inconsistency arises technologically.

Figure 19:
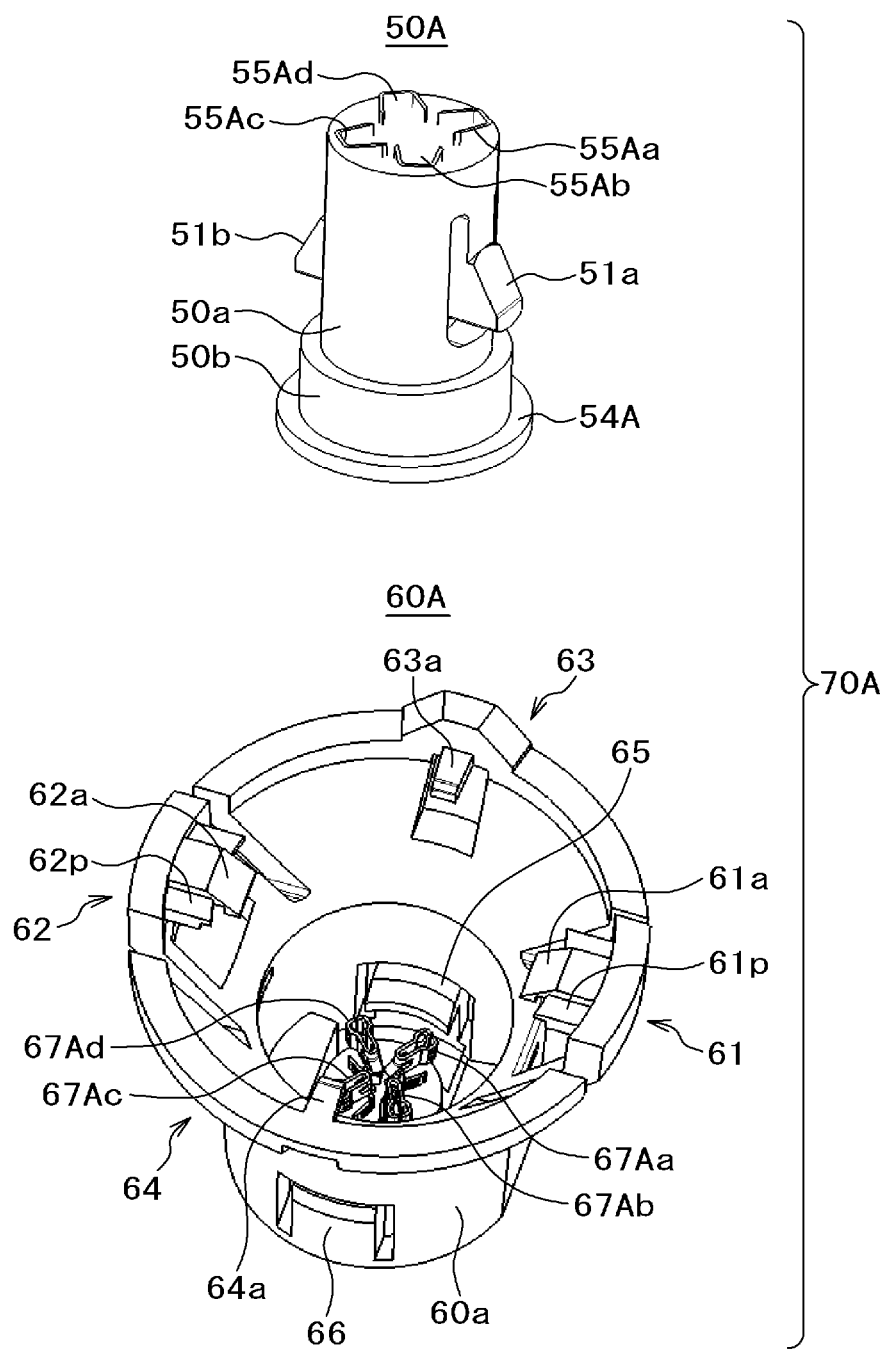
FIG. 19 is a perspective view showing a male connector and a female connector in a modification.
Figure 20:
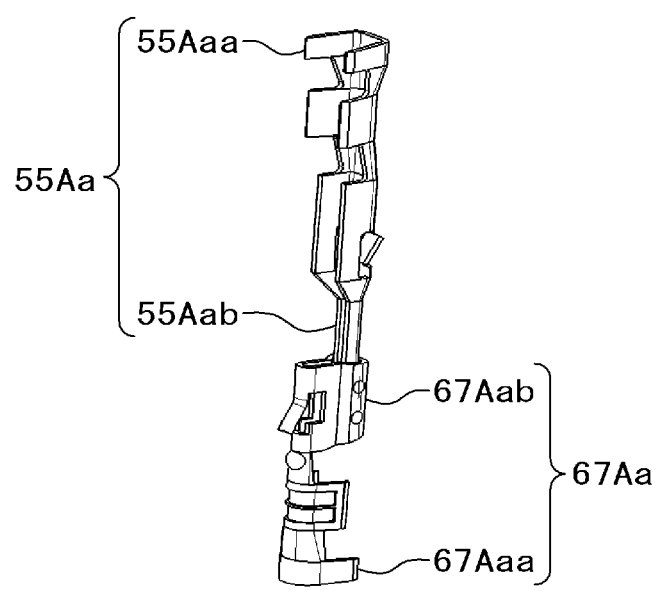
FIG. 20 is a perspective view showing a connection terminal of the male connector shown in FIG. 19 and a connection terminal of the female connector shown in FIG. 19.

A wire harness connector in a modification will be described with reference to FIG. 19 and FIG. 20. FIG. 19 is a view showing a male connector and a female connector in the modification and is a perspective view showing a state that the male connector and the female connector are out of connection. FIG. 20 is a perspective view showing a state that a connection terminal of the male connector shown in FIG. 19 and a connection terminal of the female connector shown in FIG. 19 are connected.

The wire harness connector 70A according to the modification differs in the structure of the connection terminal of the male connector 50A and the connection terminal of the female connector 60A but other structures are almost the same as those in the aforementioned embodiment.

The male connector 50A does not have portions corresponding to the peripheral walls 50*c*, 50*d* (refer to FIG. 7) of the male connector 50 and has a protrusion 54A which corresponds to the protrusions 54*a*, 54*b* of the male connector 50, at a lower end of a peripheral wall 50*b*. The protrusion 54A is formed as a shape protruding from the peripheral wall 50*b* in radial directions. The shape of the protrusion 54A takes a trapezoidal shape in section as viewed in the side view, similarly to the shape of the protrusions 54*a*, 54*b*. The protrusion 54A is engaged with the engaging claws of the second engaging pieces 65, 66 of the female connector 60A.

As shown in FIG. 19, the male connector 50A has four connection terminals 55Aa, 55Ab, 55Ac, 55Ad. As shown in FIG. 20, the connection terminal 55Aa has a first terminal portion 55Aaa connected physically and electrically to the lead wire 45*a* and a second terminal portion 55Aab taking a needle shape. Each of the connection terminals 55Ab, 55Ac, 55Ad is the same as the connection terminal 55Aa. Incidentally, although two lead wires including the lead wires 45a, 45b are connected to the male connector 50 in the foregoing embodiment, four lead wires can be connected to the male connector 50A in the modification.

As shown in FIG. 19, the female connector 60A has four connection terminals 67Aa, 67Ab, 67Ac, 67Ad. As shown in FIG. 20, the connection terminal 67Aa has a first terminal portion 67Aaa connected physically and electrically to the lead wire 36a and a second terminal portion 67Aab having an opening. The second terminal portion 55Aab of the connection terminal 55Aa of the male connector 50A is inserted and fit in the opening of the second terminal portion 67Aab of the terminal 67Aa of the female connector 60A, so that the connection therebetween is completed in a conductive state. Each of the connection terminals 67Ab, 67Ac, 67Ad is the same as the connection terminal 67Aa. Incidentally, although two lead wires including the lead wires 36a, 36b are connected to the female connector 60 in the foregoing embodiment, four lead wires can be connected to the female connector 60A in the modification.

According to the foregoing present embodiment and the modification, without using any special holder for holding the female connector, it is possible to release the holding state of the female connector on the seatback frame (the guide bracket) after the insertion connection with the male connector. Thus, it is possible to push the headrest frame further. Accordingly, it is possible to perform the adjustment of the vertical position of the headrest freely by a manual operation of the adjusting knob. For this reason, even after the connection between the male connector and the female connector, it is possible to allow the insertion operation of the headrest frame, so that the mounting and fixing of the headrest onto the seatback can also be carried out satisfactorily.

Further, according to the foregoing present embodiment and the modification, without detaching the cover of the seatback, it becomes possible to mount the headrest incorporating the electric component. Further, by this process, it does not occur that the lead wires which become an obstruction in mounting the headrest are stopped inside the bracket guide for the headrest. Thus, the time taken to mount the headrest can be improved, and hence, the cost therefor can be reduced.

As described hereinbefore, the invention made by the present inventor has been described in detail based on the embodiment and the modification. Obviously, the present invention is not limited to the foregoing embodiment and modification, and various modifications are possible.

For example, although the foregoing embodiment has been described based on the example wherein the harness connector 70 is attached to the headrest frame 42, the harness connector 70 may be attached to the headrest frame 43 and may be attached to each of the headrest frames 42, 43.

What is claimed is:

1. A vehicle seat comprising:
a seatback having a seatback frame and a mounting portion fixed to the seatback frame;
a seat cushion connected to the seatback;
a headrest having a headrest frame inserted into the mounting portion and an electric component;
a first connector attached to the headrest frame and inserted into the mounting portion; and
a second connector electrically connected to the first connector with the first connector inserted into the second connector;
wherein:
the headrest frame has a hole engaged with the first connector;
the mounting portion has a hole engaged with the second connector;
the first connector has:
an engaging portion engaged with the hole of the headrest frame;
a protrusion engaged with the second connector; and
a first connector terminal electrically connected to a lead wire of the electric component;
the second connector has:
a first engaging piece engaged with the hole of the mounting portion from the outside of the mounting portion;
a second engaging piece engaged with the protrusion of the first connector from the outside of the first connector; and
a second connector terminal electrically connected to the lead wire wired in the seatback and the first connector terminal; and
engagement between the hole of the mounting portion and the first engaging piece of the second connector is irreversibly releasable.

2. The vehicle seat according to claim 1, wherein the first engaging piece has an engaging claw engaged with the hole of the mounting portion, and the engaging claw has a slit enabling the engaging claw to be broken.

3. The vehicle seat according to claim 2, wherein:
the mounting portion is formed by a steel pipe and has a guide bracket welded to the seatback frame and a headrest guide inserted into the guide bracket; and
the hole of the mounting portion is provided in the guide bracket.

4. The vehicle seat according to claim 3, wherein the headrest guide has an engaging portion which is engaged with a lower end of the guide bracket from a radial inside of the guide bracket.

5. The vehicle seat according to claim 1, wherein the engaging portion of the first connector has a movable engaging claw engaged with the hole of the headrest frame.

6. The vehicle seat according to claim 1, wherein the second engaging piece has an engaging claw engaged with the protrusion of the first connector.

7. The vehicle seat according to claim 1, wherein the first connector is inserted into the second connector, and an end portion of the first connector is in abutment on a bottom portion of the second connector.

* * * * *